US007458487B1

(12) United States Patent
Ikushima

(10) Patent No.: US 7,458,487 B1
(45) Date of Patent: Dec. 2, 2008

(54) PLUNGER FOR SYRINGE OF LIQUID DISPENSER

(75) Inventor: Kazumasa Ikushima, Tokyo (JP)

(73) Assignee: Musashi Engineering, Inc., Tokyo (JP)

( * ) Notice: Subject to any disclaimer, the term of this patent is extended or adjusted under 35 U.S.C. 154(b) by 172 days.

(21) Appl. No.: 10/399,550

(22) PCT Filed: Nov. 1, 2000

(86) PCT No.: PCT/JP00/07685

§ 371 (c)(1),
(2), (4) Date: Apr. 23, 2003

(87) PCT Pub. No.: WO02/36270

PCT Pub. Date: May 10, 2002

(51) Int. Cl.
*G01F 11/00* (2006.01)
*B67D 5/042* (2006.01)
*B65D 83/00* (2006.01)

(52) U.S. Cl. ....................... 222/389; 222/262; 222/387; 222/399

(58) Field of Classification Search ................. 222/386, 222/387, 389, 393, 399, 262, 256
See application file for complete search history.

(56) References Cited

U.S. PATENT DOCUMENTS 4,299,238 A * 11/1981 Baidwan et al. ............. 600/576
4,615,341 A 10/1986 Marzolf et al.
4,934,379 A 6/1990 Marzolf et al.
4,951,848 A * 8/1990 Keller ........................ 222/386
5,000,355 A * 3/1991 Pritchard ................... 222/256
5,069,368 A 12/1991 Godard et al.
5,248,069 A * 9/1993 Consaga et al. ............. 222/386
5,360,146 A 11/1994 Ikushima
5,865,803 A * 2/1999 Major ........................ 604/122
5,878,922 A * 3/1999 Boring ....................... 222/387
5,881,914 A * 3/1999 Tsuda et al. .................. 222/54
5,887,764 A * 3/1999 Ennis et al. ................. 222/389
6,041,977 A * 3/2000 Lisi ............................ 222/389

(Continued)

FOREIGN PATENT DOCUMENTS

DE 19830517 7/1999

(Continued)

OTHER PUBLICATIONS

English language Abstract of JP 8-238316.

(Continued)

*Primary Examiner*—Kevin Shaver
*Assistant Examiner*—Melvin A. Cartagena
(74) *Attorney, Agent, or Firm*—Greenblum & Bernstein, P.L.C.

(57) ABSTRACT

A plunger for a syringe of a liquid dispenser comprises a tapered front end section 12 having at its rear end 16 an outer diameter slightly smaller than the inner diameter of the syringe, a cylindrical drum section 14 continued to the rear end 16 of the tapered front end section 12, having a maximum outer diameter substantially the same as the inner diameter of the syringe and opening there, and a collar member 24 (30, 32) slidably formed by coupling with an outer circumferential surface in the vicinity of an opening 22 of the drum section 14 and maintaining the close contact with an inner wall surface 26 of the syringe 18, thereby inclination toward the syringe is eliminated and action within the syringe is constantly made smooth.

5 Claims, 4 Drawing Sheets

U.S. PATENT DOCUMENTS 6,131,776 A * 10/2000 De Laforcade et al. ...... 222/387
6,334,553 B1 1/2002 Bouras et al.

FOREIGN PATENT DOCUMENTS

| | | |
|---|---|---|
| EP | 0493363 | 7/1992 |
| EP | 1132146 | 9/2001 |
| JP | 58-044038 | 3/1983 |
| JP | 60-500045 | 1/1985 |
| JP | 4-200672 | 7/1992 |
| JP | 04200672 | 7/1992 |
| JP | 5200343 | 8/1993 |
| JP | 8-238316 | 9/1996 |
| JP | 8-266624 | 10/1996 |
| JP | 09226853 | 9/1997 |
| JP | 11-023583 | 1/1999 |
| JP | 2000317370 | 11/2000 |
| JP | 2001-293413 | 10/2001 |
| TW | 356720 | 3/1998 |
| WO | 84/02278 | 6/1984 |
| WO | 97/06096 | 2/1997 |
| WO | 00/02466 | 1/2000 |

OTHER PUBLICATIONS

English language Abstract of 8-266624.
English Language Abstract of JP Appln. No. 2000-317370.
English Language Abstract of JP Appln. No. 04-200672.
English Language Abstract of JP Appln. No. 09-226853.
English Language Abstract of Taiwanese Pub. No. 356720.
English language Abstract of JP 11-023583.
English language Abstract of EP 0493363.
English language Abstract of JP 2001-293413.
English language Abstract of DE 19830517.

* cited by examiner

PLUNGER FOR SYRINGE OF LIQUID DISPENSER

TECHNICAL FIELD

The present invention relates to a plunger for a syringe suitable for precisely discharging a liquid within the syringe under the constantly appropriate pressure in a liquid dispenser used when electronic materials showing paste-like, cream-like or other conditions, adhesive agents and other liquid materials are discharged with a very small quantity and/or high frequency.

PRIOR ART

The liquid dispenser is a device widely used in electronic industries and the like for the purpose of discharging a predetermined quantity of a liquid with a very small quantity and/or high frequency from a needle attached to the end of a syringe by supplying air pressure as an air pulse into the syringe filled with a liquid material and pressurizing the liquid material with the air pulse. In case of discharging a liquid with the use of such a device, a liquid level within the syringe is lowered every time of the discharge, but when the liquid is of medium high viscosity, there is observed such a phenomenon that a deposit of the liquid on a syringe inner wall surface becomes increased and the only liquid level at the center of the syringe is particularly lowered. When such phenomenon occurs, it is difficult to ensure a fixed quantity of liquid discharge because the air penetrates the liquid.

This is particularly serious in case of discharging an opaque liquid material, and when the opaque liquid material is maintained attached to a transparent syringe wall surface, the low ring of the liquid level cannot visually be observed from outside through the syringe. Thus, the discharge of the liquid may be continued without realizing that the pressurized air also being penetrating the liquid.

Therefore, in order to prevent the occurrence of such phenomenon, there are trials for pressurizing the whole surface of a liquid material with a plunger substantially uniformly and preventing adhering or attaching of the liquid material to a syringe wall surface by disposing a cylindrical plunger as shown in FIGS. 4(*a*) and 4(*b*), a plunger with seal rings arranged around the circumference of a cylinder as shown in FIG. 5 and a plunger formed with two upper and lower flanges around the circumference of a bottomed cylinder as shown in FIG. 6.

In such prior art, however, as shown in FIG. 4(*a*), when a liquid material c is pressurized by a cylindrical plunger b having a diameter slightly smaller than the inner diameter of a syringe a, if the liquid material c includes a solid body such as cream solder, the solid body is jammed between the syringe a and the cylindrical plunger b, thereby obstructing a smooth operation of the plunger b so as to prevent discharge of a predetermined quantity of the liquid. On the other hand, when a diameter of the cylindrical plunger b is made fairly smaller than the inner diameter of the syringe a as shown in FIG. 4(*b*), there is no possibility of jamming a solid body therebetween, but a passing quantity of the liquid material between them becomes increased and the plunger b sinks within the liquid so as to be impossible to effectively exhibit an essential function of the plunger b and also impossible to visually observe the liquid level from the outside.

Moreover, as shown in FIG. 5, in a plunger e arranged with seal rings d around the circumference of a cylindrical body, it is possible to sufficiently prevent passage of the liquid material between the syringe a and the plungers, but under deformation of a soft seal ring d, a solid body contained in the liquid material is sandwiched between the seal ring and the syringe so that a smooth movement of the plunger e is prevented and further an appropriate pressurization of the plunger e by an air pulse by frictional resistance of the seal ring d to the syringe wall surface is prevented.

Furthermore, in a plunger f with flanges as shown in FIG. 6, it is possible to effectively prevent both the passing of the liquid material c between the plunger f and the syringe inner wall surface and the meshing of a solid body contained in the liquid material c between the flange g and the inner wall surface of the syringe a, but in case of discharging the liquid material c from a needle by supplying air pressure to the plunger f, at an instant of stopping supply of air pressure to the plunger f, a force for pushing the liquid material back to the plunger f is acted by a compressive reaction force of the liquid material c which receives a compressive force until then, thereby absorbing the air particularly to the lower side of the flange g positioned at the upper side from the further upper side, and the thus once absorbed air cannot escape to the upper side of the flange g in a usual discharging step of the liquid material c, or rather increases by repeating the discharging step, which is substantially the same in a plunger e arranged with seal rings d around the circumference of the cylindrical body as shown in FIG. 5.

With the increase of the absorbing air, a pressure of pressurized air supplied in pulse-like state to the plunger is transmitted to the liquid material via the absorbing air which carries out compressive deformation, so that a transmitting rate to the liquid material becomes slow, so that a change is brought about in a discharge quantity of the liquid material discharged from the needle, and worst of all, the liquid material is never discharged.

In order to solve such problems, the inventor of the present application previously proposed an improved plunger as JP-A-5-200343 (U.S. Pat. No. 5,360,146).

This plunger is composed of, as shown in FIG. 7, a tapered front end section 1 having at its rear end 4 an outer diameter slightly smaller than the inner diameter of a syringe, a small diameter drum section 2 having an outer diameter smaller than the outer diameter of the tapered front end section at the rear end 4 and continued to the rear of the tapered front end section 1, a cylindrical section 3 further continued to the rear of the small diameter drum section 2 and having a maximum outer diameter larger than the inner diameter of the syringe, and a slit 7 extended to an axial direction of the syringe to divide the cylindrical section 3 into plural blade members 8.

In this improved proposition, however, there are remained problems to be solved as follows. That is, in the prior art, the plunger contacts the inner wall surface of the syringe at the two sections, i.e. the cylindrical section 3 provided at the upper part of the plunger and the rear end 4 of the tapered front end section 1 provided at the lower part of the plunger, and there is existent a clearance for permitting the passage of a solid body sometimes contained in the liquid material between the rear end 4 and the inner wall surface of the syringe, so that the plunger cannot completely be prevented from obliquely inclining, and when such an inclination occurs, the maximum outer diameter section of the plunger cannot be uniformly made contact with the syringe inner wall surface, while a thrust of the plunger by air pressure acts upon not only downward but also the syringe inner wall surface side, so that a smooth movement of the plunger cannot be ensured.

Moreover, in the plunger according to the previously proposed technique, the cylindrical section 3 provided at the upper part is a comparatively thin cylinder, and the tapered front end section 1 provided at the lower part and the small diameter drum section 2 are provided with a center bore 9 in an axial direction, but are comparatively thick as a whole, so that the plunger is suitable for a very small quantity discharge of the liquid material having comparatively large specific gravity and medium high viscosity, but is not suitable for a very small quantity discharge of the liquid material having comparatively small specific gravity and low viscosity such as water and alcohol.

SUMMARY OF THE INVENTION

An object of the invention is to provide a plunger for a syringe of a liquid dispenser which solves all problems kept in the above-described prior art, particularly to provide a plunger which is constantly excellent in resilient close-contact with the inner wall surface of the syringe and even in case of discharging a very small quantity of the liquid material having comparatively small specific gravity, constantly smooth movement can be ensured.

The inventor has earnestly studied for attaining the above objects and attained the invention comprising the following constituents.

That is, a plunger for a syringe of a liquid dispenser according to the invention comprises, a tapered front end section having at its rear end an outer diameter slightly smaller than the inner diameter of the syringe; a cylindrical drum section continued to the rear end of the tapered front end section, and having at its rear end a maximum outer diameter substantially the same as the inner diameter of the syringe and opened there; and a collar member coupling with a circumferential surface of the drum section in the vicinity of the opening and being slidably formed as maintaining a close-contact with the inner wall surface of the syringe.

In the above plunger, the collar member is preferably composed of two annular curved surface sections which are in close contact with different inner surface regions along a circumferential direction of the inner wall surface of the syringe.

It is further preferable to form a capillary passage communicating from the vicinity of a connecting section between the collar member and the cylindrical drum section to the inside of the cylindrical drum section.

Moreover, it is preferable to form the whole plunger from a comparatively soft or resilient resin material.

Furthermore, the plunger for the syringe of the liquid dispenser according to the invention is composed of a resin material having comparatively soft elasticity, having a substantially shell-like thin hollow structure as a whole, and interposed between the liquid material and pressurized air to receive and transmit the air pressure to the liquid material, and characterized by comprising a tapered front end section having at its rear end an outer diameter slightly smaller than the inner diameter of the syringe, a cylindrical drum section continued to the rear end of the tapered front end section, having at its rear end a maximum outer diameter substantially the same as the inner diameter of the syringe and opened there, a collar member slidably provided in the state of coupling with an outer circumferential surface in the vicinity of the opening of the drum section and elastically contacted to the inner wall surface of the syringe, and a capillary passage communicating from the vicinity of the coupling section between the collar member and the cylindrical drum section to the inside of the cylindrical drum section.

BRIEF DESCRIPTION OF THE DRAWINGS

FIG. 3 is a partially enlarged view of FIG. 1;

DESCRIPTION OF THE PREFERRED EMBODIMENT

Figure 1:
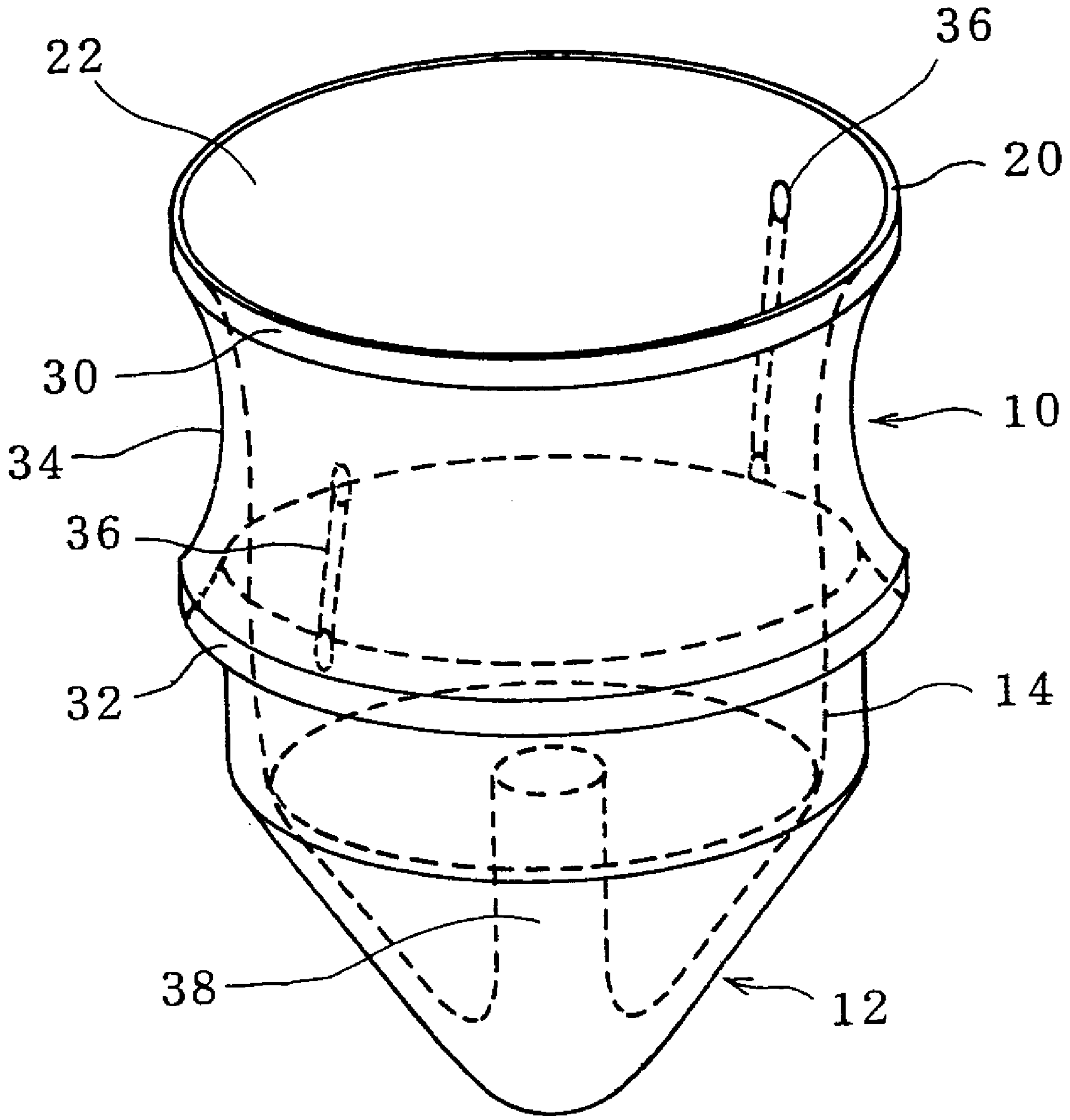
FIG. 1 is a perspective view showing one embodiment of the invention.

A plunger for a syringe of a liquid dispenser according to the present invention is characterized in a point that vertical movement along a syringe inner wall surface, i.e. axial movement can be carried out by constantly maintaining a collar member coupled with the outer circumferential surface of a cylindrical drum section in the state of resiliently and closely contacting the syringe inner wall surface.

According to such a structure, as there is no inclination of the plunger toward the syringe, the plunger can always ensure smooth sliding or axial movement.

Moreover, in the plunger, it is preferable to construct a collar member face-contacted with the syringe inner wall surface with two annular curved face sections for the resilient close-contact with different inner face regions along a circumferential direction of the syringe inner wall surface.

Such construction can more stabilize the face-contact of the collar member with the syringe inner wall surface, so as to prevent positional inclination of the plunger, and to further smoothly move to an axial direction of the plunger by maintaining the closely contacting state.

Further, it is preferable to form a capillary passage communicated to the inside of the cylindrical drum section from the vicinity of the connecting section between the collar member and the cylindrical drum section. The capillary passage has a function of exhausting air contained in the liquid material to the outside of the plunger, thereby preventing sucking the air into a contact boundary surface between the collar member and the syringe inner wall surface, so as to more stably discharge the liquid material.

Furthermore, the plunger is preferably formed with a resin material having comparatively soft elasticity such as Teflon® resin and the like, and preferably has a substantially shell-like thin hollow structure. Thereby, weight of the whole plunger can be made light to suitably discharge the liquid material having small specific gravity and to give elasticity to the collar member, and in case of receiving air pressure, the whole plunger is conically extended, particularly the vicinity of the rear end of the cylindrical drum section is extended in a syringe inner wall surface direction, thereby more resilient close contact of the collar member to the syringe inner wall surface and moving as its contact condition is maintained, so that the discharge work is made possible by completely scratching the liquid material off.

In such condition, when the plunger is inserted into the syringe, the collar member coupled with the outer circumferential surface of the cylindrical drum section is brought to be close-contact at its annular curved surface with the syringe inner wall, thereby fully preventing inclination of the plunger to the syringe and constantly ensuring appropriate insertion.

Moreover, in case of this insertion, the tapered front and section forces out an air as well as the liquid material, even when a solid body is contained therein, to the side of the cylindrical drum section under an appropriate clearance between the rear end and the syringe. On the other hand, the liquid material forced out to the upper side of the syringe, in spite of the content of a solid body, is effectively interrupted under the elastically deformed state to a reduced diameter direction by the cylindrical drum section stuck in the syringe and in its turn, each collar member.

Here, therefore, even in insertion of the plunger into the syringe and the following discharge work, adhesion and residue of the liquid material to the syringe wall surface can effectively be prevented by elastic adhesion of the collar member to the greater part of the wall surface to the circumferential direction, and the solid body sucked between the syringe wall surface and the collar member can positively be prevented. That is, the liquid material adhered or attached to the syringe inner wall surface can cleanly be scraped and the position of a liquid level can clearly and visually be observed.

And, in case of supplying air pressure in pulse-like state to the plunger inserted into the syringe, the air pressure indirectly pressurizes the liquid material via the plunger, and as a result, the liquid material is discharged by a predetermined amount in accordance with air pressure and pulse length from a needle secured to the front end section of the syringe.

Moreover, in such a discharge step, even if the solid body contained in the liquid material reaches a collar member, the collar member is face-contacted with the syringe wall surface under the elastically deformed state, so that there is no possibility of being sandwiched between the collar member and the syringe as described above, and hence, smooth action of the plunger is ensured.

An embodiment of the pr sent invention will be explained by referring to the accompanying drawings.

Figure 2:
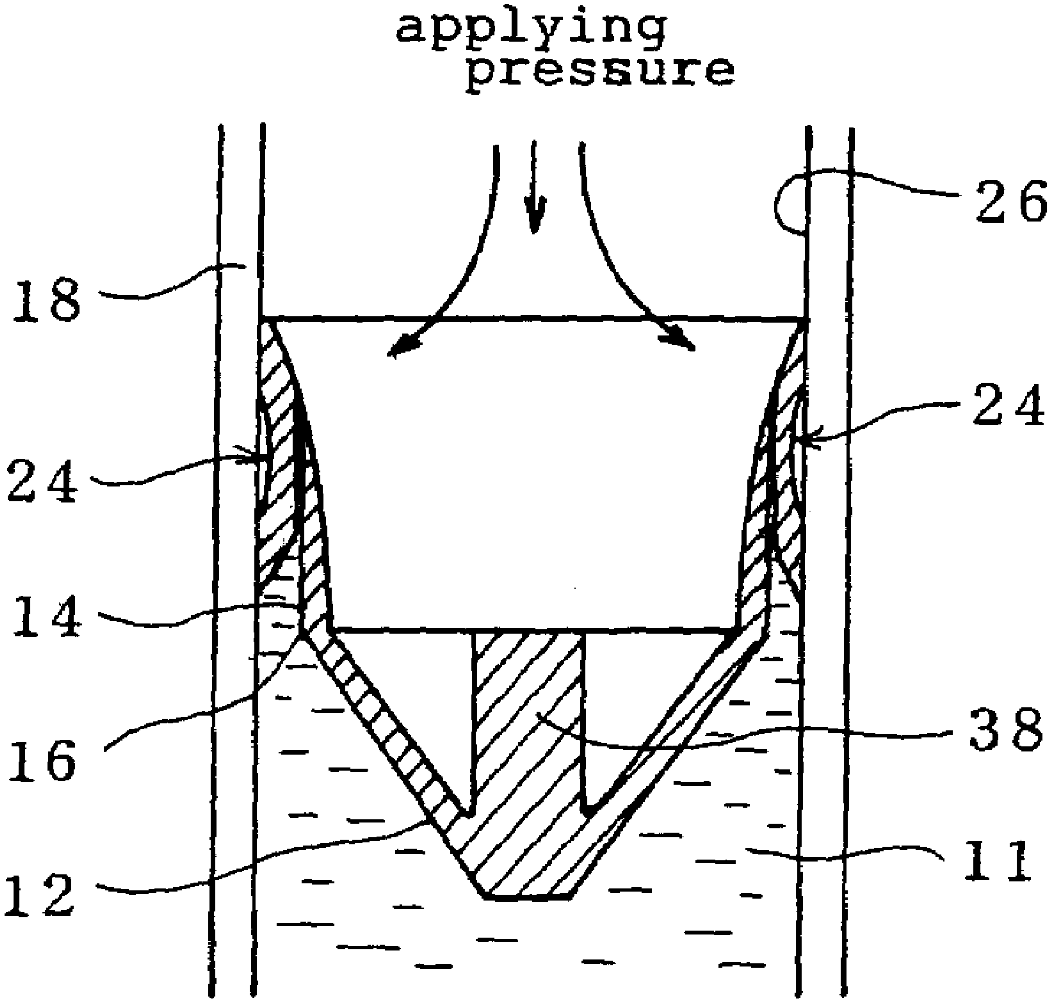
FIG. 2 is a roughly longitudinal cross section of FIG. 1.
Figure 4A:
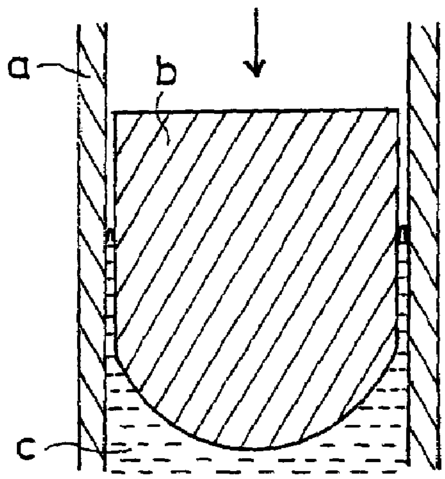
FIGS. 4(*a*) and 4(*b*) are roughly longitudinal cross sections showing a prior art.
Figure 4B:
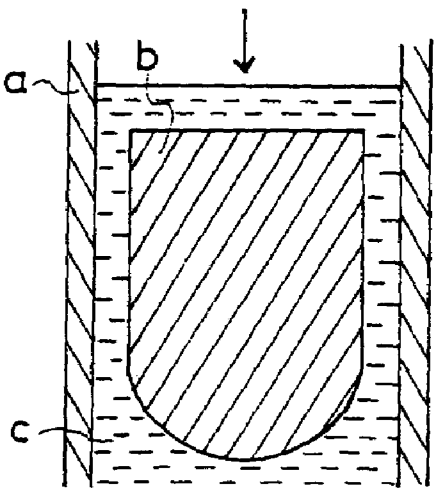
Figure 5:
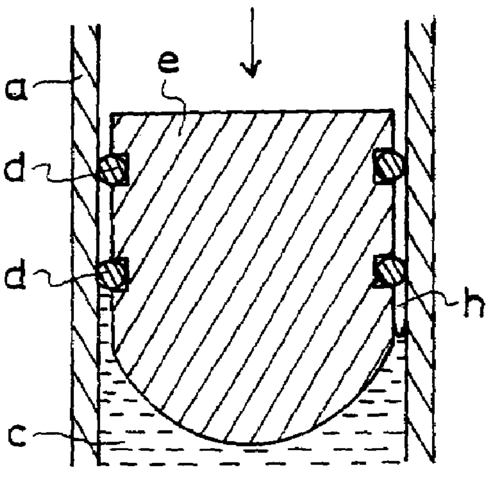
FIG. 5 is a roughly longitudinal cross section showing another prior art.
Figure 6:
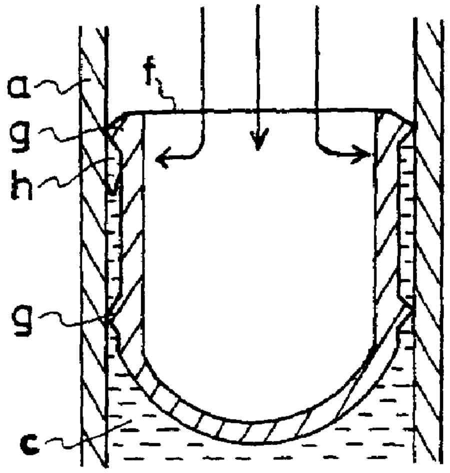
FIG. 6 is a roughly longitudinal cross section showing a further prior art.
Figure 7:
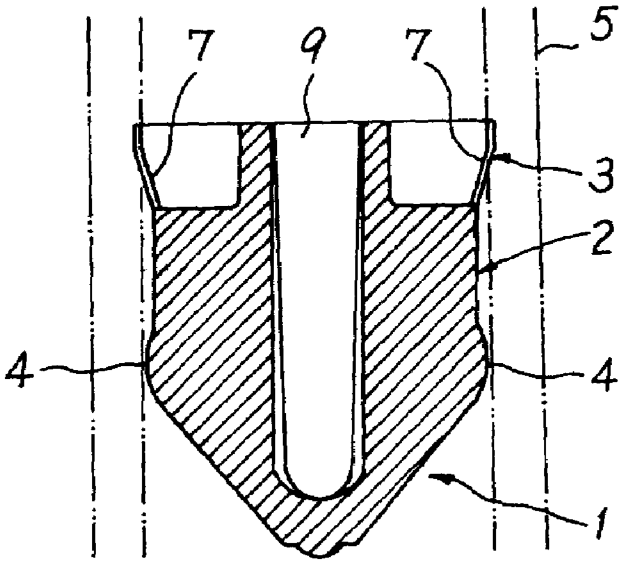
FIG. 7 is a roughly longitudinal cross section showing a further another prior art.

FIG. 1 is a roughly perspective view of a plunger according to the invention, FIG. 2 is a longitudinal cross section and FIG. 3 is an enlarged view of the essential part in FIG. 2.

Here, in the drawings, a reference numeral 10 denotes a plunger of a shell-like thin hollow structure as a whole composed of a soft material having elasticity such as Teflon® and the like, 12 a tapered front end section which can be conical or other shape, and 14 a thin cylindrical drum section having a suitable shape such as a straight cylinder or a cylinder having an outer diameter at least gradually increases toward the rear or a cylinder having uniform inner and outer diameters only at its rear end, and the like, and each of these sections positions on the same axis.

The outer diameter at a rear end 16 of the tapered front end section 12 is slightly smaller than the inner diameter of a syringe 18, and not only air and liquid material 11 but also a solid body contained in the liquid material 11 can be passed and fluidized therebetween.

And, the outer diameter of the cylindrical drum section 14 continued to the rear end 16 of the tapered front end section 12 is gradually extended as separated from the rear end 16 and becomes a maximum outer diameter at the rear end 20 of the drum section 14. The maximum outer diameter is substantially the same as the inner diameter of the syringe 18, thereby in the state of inserting into the syringe 18, as described later on, a collar member 24 coupled with the outer circumferential surface of the cylindrical drum section 14 is brought to be in fully face-contact with a syringe inner wall surface 26 by elastic deformation thereof, and positively preventing penetration of the solid body therebetween and adhesion and residue of the liquid material 11 to the syringe wall surface.

Here, the cylindrical drum section 14 is opened at the rear end 20 as shown by a reference numeral 22, and at the vicinity of its opened peripheral section is coupled with the collar member 24. The collar member 24 in this embodiment is integrally formed with a cylindrical drum section 14, a first annular curved surface 30 at the position corresponding to the opened peripheral edge of the cylindrical drum section 14 and a second annular curved surface 32 at the separated position to the tapered front end section 12 are respectively formed into sliding surfaces to the syringe inner wall surface, and there is formed a concave curved surface 34 for connecting these two annular curved surfaces 30 and 32.

Each of the annular curved surfaces 30, 32 is formed into a shape so as to be in close contact with the inner wall surface 26 of the syringe 18, that is, the same shape as part of the outer circumferential surface of the cylinder having an outer diameter slightly larger than the inner diameter of the syringe. When the plunger 10 is inserted into the syringe 18 and moved to the axial direction, the annular curved surfaces 30,32 receive elastic deformation so as to be in close contact with the syringe inner wall surface 26, thereby ensuring the smooth axial movement of the plunger 10 maintaining the close-contact state.

Such collar member 24 and annular curved surfaces 30, 32 are tightly face contacted with the syringe wall surface 26 under their elastic deformation, so that some unevenness of the inner diameter of the syringe can sufficiently be absorbed.

Moreover, from the vicinity of the root of the collar member 24, that is, from the cylindrical drum section 14 in the vicinity of the liquid level of the liquid material 11, as shown in FIG. 1, are at diametrical position provided a pair of capillary passages 36 communicated to the inside to exhaust air contained in the liquid material and a small part of the liquid material therethrough to the outside.

In the illustrated example, a column 38 is provided standing at the inner central section of the tapered front end section 12, and there is provided a screw hole from the top to the bottom of the column 36 to be engaged with a male screw member (not shown), so that it becomes easier to pull the plunger 10 pushed in the exit limit position out of the syringe 18, and to firmly screw a detector member when the liquid level within the syringe 18 is measured by a proximity sensor and the like.

An action of the plunger constructed as above is briefly explained.

When the plunger 10 is inserted into the syringe 18 which is filled with the liquid material 11 in advance, the plunger 10 is pushed toward an axial line of the syringe 18 by means of hands and fingers or a pusher, and the plunger 10 smoothly enters into the syringe 18 by being prevented inclination to the syringe 18 with face-contact of two annular curved surfaces 30, 32 of the collar member 24 to the syringe inner wall surface 26.

Here, when the tapered front end section 12 enters into the liquid material 11, part of the liquid material is pushed away by the tapered front end section 12, and if the section further moves on, the liquid material 11 rapidly passes between the rear end 16 of the tapered front end section 12 and the syringe inner wall surface 26 to reach the cylindrical drum section 14 and the collar member 24.

Moreover, before a part of the liquid material 11 and sealed air reach the collar member 24, the air previously existent around the collar member 24 is gradually exhausted to the outside through the column 38 provided in the cylindrical drum section 14 as the liquid material 11 and the sealed air are flowed around the collar member 24.

Upon this, in case of pushing the plunger 10 into the syringe 18, even if a solid body contained in the liquid material 11 reaches the collar member 24, the solid body has no room to enter therebetween because the annular curved surfaces 30,32 of the collar member 24 are tightly contacted with the syringe wall surface, and hence, there is no possibility of intruding the solid body at all.

The actions of each part of the plunger 10 are entirely the same in case of not only the pushing-in but also the following discharge step.

The present invention will be described a little bit more in detail. When a pressurized air is blown in the syringe 18, the cylindrical drum section 14 of the plunger 10 is extended outwardly as a whole, and in this case, the opening section 22 is conically extended, so that a degree of contact of the first annular curved surface 30 to the syringe inner wall surface 26 becomes more stronger.

If the plunger 10 is formed to make gradually thin from the tapered front end section 12 to the rear end of the cylindrical drum section 14, in case of receiving pressure of pressurized air, the vicinity of the rear end of the cylindrical drum section 14 is particularly delicately conically extended. Therefore, since the first annular curved surface 30 can move to the axial direction as more close contact with the syringe inner wall surface 26 is maintained, the discharge work can be carried out by cleanly scraping the liquid material. On the other hand, in this case, the second annular curved surface 32 is in close-contact with the syringe inner wall surface 26, but less extended toward the direction of the syringe inner wall surface, so that there is no strongly contact condition as in the first annular curved surface 30. Therefore, there is no elastic deformation for contacting the whole body of the concave curved surface 34 with the syringe inner wall surface 26, so that smooth movement of the plunger 10 is not prevented.

And thereafter, at every time when pulse-like air pressure is supplied to the plunger 10, the first annular curved surface 30 is extended to the direction of the syringe inner wall surface 26 to be in more strongly and elastical contact with the inner wall surface 26 and to become smoothly movable under the same condition, thereby discharging the liquid material 11. And, when the discharge amount reaches a predetermined amount, if the supply of air pressure is stopped, the first annular curved surface 30 is extended to the direction opposite to the syringe inner wall surface 26 by its elasticity to return to the original contact state.

As apparent from the above explanation, according to the present invention, axial movement of the plunger 10 along the syringe inner wall surface 26 can be carried out in the state of constantly and closely contact of the collar member 24 with the syringe inner wall surface 26, and particularly when receiving air pressure, the collar member 24 is brought to be in close or tight contact with the syringe inner wall surface 26 by the elastic force and slides along the syringe inner wall surface 26, so that inclination of the plunger 10 with respect to the syringe 18 is eliminated, permitting smooth operation of the plunger 10. Further, as the liquid material adhered or attached to the syringe inner wall surface 26 can completely be scraped, the liquid level can extremely easily observed from the outside of the syringe 18 with the human eyes. Moreover, the air pressure acted on the plunger 10 can directly be transmitted to the liquid material and a predetermined amount of the liquid can positively be discharged, while dropping of the liquid material from the needle front end due to compressed suction air extended after stopping a supply of the pressurized air can almost completely be prevented.

What is claimed is:

1. A plunger for a syringe of a liquid dispenser for pressurizing a liquid material contained in the syringe by compressed air to discharge a predetermined quantity of the liquid from a needle connected to a front end of the syringe, wherein the plunger comprises an elastic resin material and has a substantially shell-like thin hollow structure, the plunger being interposed between the liquid material and pressurized air to receive and transmit the air pressure to the liquid material, the plunger comprising:

a tapered front section having a rear end, an outer diameter of the rear end of the tapered front section being slightly smaller than an inner diameter of the syringe;

a cylindrical drum section comprising a continuation of the rear end of the tapered front section, a rear end of said cylindrical drum section having an outer diameter substantially the same as the inner diameter of the syringe, a rear end of said cylindrical drum portion being open, the open end of the cylindrical drum section receiving compressed air from the syringe for pressurizing the liquid material contained in the syringe to discharge the liquid from the outlet in the syringe;

a collar member coupled with a circumferential surface of the cylindrical drum section and configured to maintain a close sliding contact with an inner wall surface of the syringe, a first longitudinal end of the collar member being circumferentially joined to the cylindrical drum section at the open end of the cylindrical drum section; and a capillary passage configured to communicate between a vicinity of the coupling section, defined between the collar member and the cylindrical drum section, and the inside of the cylindrical drum section.

2. The plunger according to claim 1, wherein the collar member comprises two annular curved surface sections configured to be in close contact with different inner surface regions defined along a circumferential direction of the inner wall surface of the syringe.

3. The plunger according to claim 2, wherein a diameter of each of said two annular curved sections is slightly larger than the inner diameter of the syringe.

4. The plunger according to claim 1, wherein the open rear end of the cylindrical drum section contacts an end of said collar member.

5. The plunger according to claim 1, wherein the cylindrical drum section is configured to extend outwardly upon receiving compressed air so that a degree of contact of the collar member to the inner wall surface of the syringe becomes stronger.

* * * * *